United States Patent
Yamazaki et al.

(10) Patent No.: US 12,439,148 B2
(45) Date of Patent: Oct. 7, 2025

(54) IMAGING DEVICE, ENDOSCOPE SYSTEM, CAMERA UNIT, SCOPE, AND IMAGING METHOD

(71) Applicant: OLYMPUS MEDICAL SYSTEMS CORP., Hachioji (JP)

(72) Inventors: Susumu Yamazaki, Tachikawa (JP); Takaharu Tani, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 114 days.

(21) Appl. No.: 18/407,600

(22) Filed: Jan. 9, 2024

(65) Prior Publication Data

US 2024/0147056 A1 May 2, 2024

Related U.S. Application Data

(63) Continuation of application No. PCT/JP2021/027168, filed on Jul. 20, 2021.

(51) Int. Cl.
*H04N 23/65* (2023.01)
*H04N 23/50* (2023.01)

(52) U.S. Cl.
CPC ........... *H04N 23/65* (2023.01); *H04N 23/555* (2023.01)

(58) Field of Classification Search
CPC ...... H04N 23/65; H04N 23/555; A61B 1/045; G02B 23/24
See application file for complete search history.

(56) References Cited

U.S. PATENT DOCUMENTS

| | | | | |
|---|---|---|---|---|
| 2014/0300717 A1* | 10/2014 | Yokohama | ............. | H04N 23/66 348/68 |
| 2015/0280550 A1* | 10/2015 | Minakuchi | ......... | G02B 23/2484 323/234 |
| 2016/0220095 A1* | 8/2016 | Shimomura | ....... | A61B 1/00006 |
| 2019/0117053 A1 | 4/2019 | Ogihara et al. | | |
| 2025/0112490 A1* | 4/2025 | Itoi | ................... | H02J 7/007192 |

FOREIGN PATENT DOCUMENTS

| | | |
|---|---|---|
| JP | 2011-206333 A | 10/2011 |
| JP | 2015-192696 A | 11/2015 |
| WO | 2018/088005 A1 | 5/2018 |

OTHER PUBLICATIONS

International Search Report dated Oct. 5, 2021, issued in counterpart International Application No. PCT/JP2021/027168, with English Translation. (4 pages).

* cited by examiner

*Primary Examiner* — Mekonnen D Dagnew
(74) *Attorney, Agent, or Firm* — WHDA, LLP (57) ABSTRACT

An imaging device includes a camera unit and a control unit. A first power source voltage is transferred from the camera unit to the control unit by a power source line and is input to the camera unit as a second power source voltage. The camera unit consumes the second power source voltage as a load current in a voltage-monitoring period. The control unit measures a value of the second power source voltage transferred from the camera unit by the video signal line in the voltage-monitoring period. The control unit adjusts a value of the first power source voltage in the video output period based on the measured value.

8 Claims, 9 Drawing Sheets

IMAGING DEVICE, ENDOSCOPE SYSTEM, CAMERA UNIT, SCOPE, AND IMAGING METHOD

The present application is a continuation application based on International Patent Application No. PCT/JP2021/027168 filed on Jul. 20, 2021, the content of which is incorporated herein by reference.

BACKGROUND OF THE INVENTION

Field of the Invention

The present invention relates to an imaging device, an endoscope system, a camera unit, a scope, and an imaging method.

Description of Related Art

An endoscope system includes a scope (camera unit) and a control unit. The scope and the control unit are connected to each other by a power source cable. An imager is disposed in the distal end of the scope. The control unit outputs a first power source voltage used for driving the imager to the power source cable. The first power source voltage is transferred to the scope by the power source cable and is input to the scope as a second power source voltage. Due to an influence of a current flowing through the power source cable and the resistance value of the power source cable, a voltage drop is generated in the power source cable. Therefore, the second power source voltage in the imager is lower than the first power source voltage output from the control unit.

The amount of the current flowing through the power source cable changes in accordance with the driving state of the imager. Therefore, the control unit needs to output a first power source voltage having a high value to the power source cable in light of the voltage drop that occurs in accordance with a change of the current. However, a first power source voltage having a high value results in an increase of power consumption in the imager and an increase of the amount of heat generation in the power source cable. Therefore, it is required that the value of the second power source voltage in the imager be monitored and a first power source voltage having an optimal value be output to the power source cable.

A method of calculating the resistance value of the power source cable and calculating the value of the second power source voltage in accordance with the following Expression (1) has been considered in order to monitor the value of the second power source voltage.

$$Vcis = Vout - Rc * Ic \quad (1)$$

In Expression (1), a voltage value Vcis indicates the value of the second power source voltage, and a voltage value Vout indicates the value of the first power source voltage. In Expression (1), a resistance value Rc indicates the resistance value of the power source cable, and a current value Ic indicates the value of the current flowing through the power source cable.

A technique disclosed in Japanese Unexamined Patent Application, First Publication No. 2011-206333 provides a function of adjusting a power source voltage based on a voltage (distal end voltage) in the distal end of the scope. According to the technique, the distal end voltage is constantly monitored by using a dedicated cable for determining the distal end voltage, and the power source voltage is adjusted such that the value of the distal end voltage has an appropriate value.

SUMMARY OF THE INVENTION

According to a first aspect of the present invention, an imaging device includes a camera unit and a control unit connected to each other by a power source line that transfers a first power source voltage and a video signal line that transfers a video signal. The first power source voltage transferred from the control unit by the power source line is input to the camera unit as a second power source voltage. The camera unit includes an image sensor, a load circuit, a transmission buffer, and a switch. The image sensor is configured to generate the video signal by using the second power source voltage. The load circuit is configured to consume the second power source voltage as a load current in a voltage-monitoring period. The transmission buffer is configured to output the video signal as a current to the video signal line in a video output period different from the voltage-monitoring period. The switch is configured to connect the power source line and the video signal line to each other in the voltage-monitoring period and disconnect the power source line and the video signal line from each other in the video output period. The control unit includes a voltage generation circuit, a signal reception circuit, a voltage measurement circuit, and a voltage control circuit. The voltage generation circuit is configured to generate the first power source voltage and output the generated first power source voltage to the power source line. The signal reception circuit is configured to receive the video signal transferred from the camera unit by the video signal line in the video output period. The voltage measurement circuit is configured to measure a value of the second power source voltage transferred from the camera unit by the video signal line in the voltage-monitoring period. The voltage control circuit is configured to adjust a value of the first power source voltage in the video output period by controlling the voltage generation circuit based on the value measured by the voltage measurement circuit.

According to a second aspect of the present invention, in the first aspect, the amount of the load current may be the same as the amount of the current of the video signal.

According to a third aspect of the present invention, in the first aspect, the voltage-monitoring period may be included in a blanking period of the image sensor.

According to a fourth aspect of the present invention, in the first aspect, the camera unit may further include a second switch, a third switch, a voltage-holding circuit, a voltage determination circuit, and a current control circuit. The second switch is configured to disconnect the transmission buffer and the video signal line from each other in the voltage-monitoring period and connect the transmission buffer and the video signal line to each other in the video output period. The third switch is configured to connect the power source line and the load circuit to each other in the voltage-monitoring period and disconnect the power source line and the load circuit from each other in the video output period. The voltage-holding circuit is configured to hold a first voltage generated in the second switch when the current of the video signal flows through the second switch in the video output period. The voltage determination circuit is configured to determine a second voltage generated in the third switch when the load current flows through the load circuit in the voltage-monitoring period. The current control circuit is configured to cause the amount of the load current to match the amount of the current of the video signal based on the first voltage held in the voltage-holding circuit and the second voltage determined by the voltage determination circuit.

According to a fifth aspect of the present invention, an endoscope system includes a scope to be inserted into a living body and the imaging device. The camera unit is disposed in a distal end of the scope.

According to a sixth aspect of the present invention, a camera unit is connected to a control unit by a power source line that transfers a first power source voltage and a video signal line that transfers a video signal. The first power source voltage transferred from the control unit by the power source line is input to the camera unit as a second power source voltage. The camera unit includes an image sensor, a load circuit, a transmission buffer, and a switch. The image sensor is configured to generate the video signal by using the second power source voltage. The load circuit is configured to consume the second power source voltage as a load current in a voltage-monitoring period. The transmission buffer is configured to output the video signal as a current to the video signal line in a video output period different from the voltage-monitoring period. The switch is configured to connect the power source line and the video signal line to each other in the voltage-monitoring period and disconnect the power source line and the video signal line from each other in the video output period.

According to a seventh aspect of the present invention, a scope is to be inserted into a living body and includes the camera unit. The camera unit is disposed in a distal end of the scope.

According to an eighth aspect of the present invention, an imaging method is executed in an imaging device including a camera unit and a control unit connected to each other by a power source line that transfers a first power source voltage and a video signal line that transfers a video signal. The control unit includes a voltage generation circuit configured to generate the first power source voltage and output the generated first power source voltage to the power source line. The first power source voltage transferred from the control unit by the power source line is input to the camera unit as a second power source voltage used for driving an image sensor of the camera unit. The imaging method includes a connection step, a voltage measurement step, a disconnection step, a video output step, a signal reception step, and a voltage adjustment step. A switch of the camera unit connects the power source line and the video signal line to each other in a voltage-monitoring period and a load circuit of the camera unit consumes the second power source voltage as a load current in the voltage-monitoring period in the connection step. A voltage measurement circuit of the control unit measures a value of the second power source voltage transferred from the camera unit by the video signal line in the voltage-monitoring period in the voltage measurement step. The switch disconnects the power source line and the video signal line from each other in a video output period different from the voltage-monitoring period in the disconnection step. A transmission buffer of the camera unit outputs the video signal as a current to the video signal line in the video output period in the video output step. A signal reception circuit of the control unit receives the video signal transferred from the camera unit by the video signal line in the video output period in the signal reception step. A voltage control circuit of the control unit adjusts a value of the first power source voltage in the video output period by controlling the voltage generation circuit based on the value measured by the voltage measurement circuit in the voltage adjustment step.

DETAILED DESCRIPTION OF THE INVENTION

Hereinafter, embodiments of the present invention will be described with reference to the drawings. Each of the embodiments will be described in detail by using an endoscope system as an example of an imaging device.

First Embodiment

Figure 1:
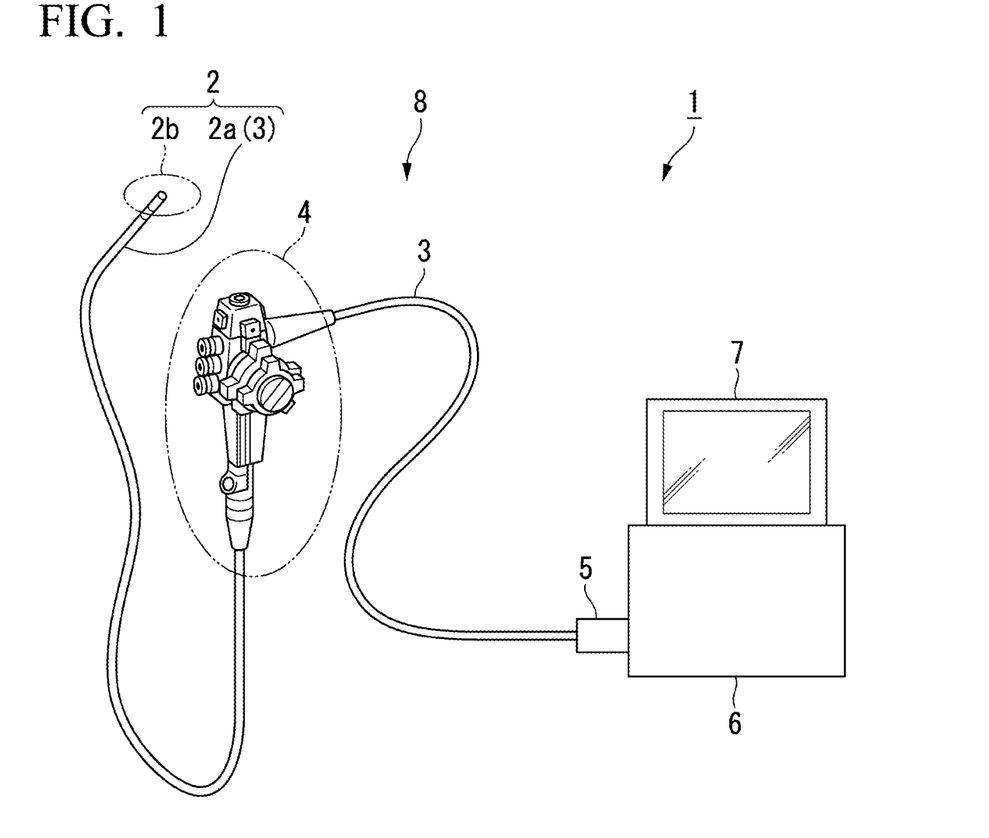
FIG. 1 is a schematic diagram showing a configuration of an endoscope system according to a first embodiment of the present invention.

FIG. 1 shows a configuration of an endoscope system 1 according to a first embodiment of the present invention. The endoscope system 1 shown in FIG. 1 includes an endoscope insertion unit 2, a transmission cable 3, an operation unit 4, a connector unit 5, a control unit 6, and a display device 7. The endoscope insertion unit 2, the transmission cable 3, the operation unit 4, and the connector unit 5 constitute a scope 8.

Figure 2:
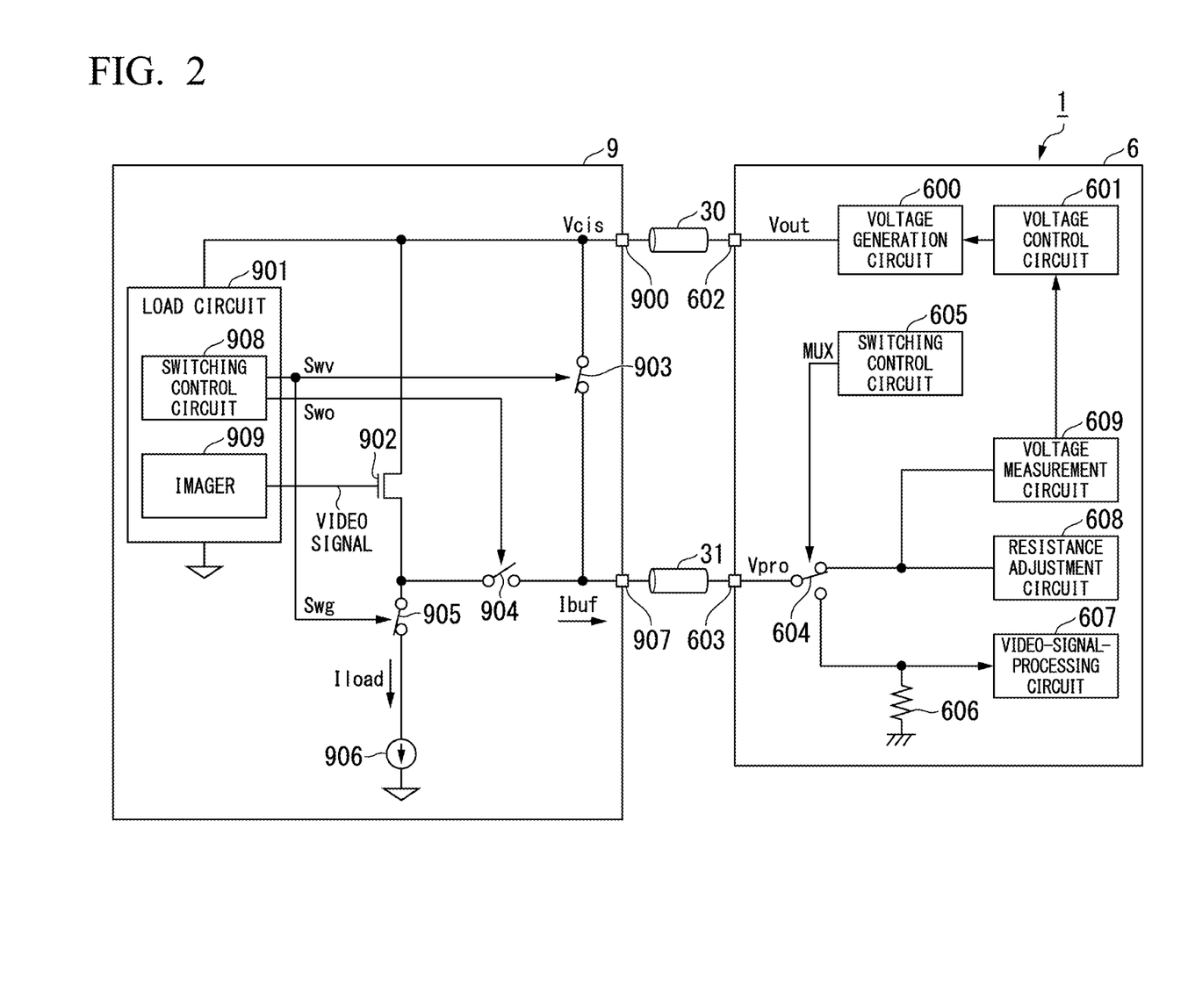
FIG. 2 is a block diagram showing a configuration of the endoscope system according to the first embodiment of the present invention.

The endoscope insertion unit 2 includes an insertion unit 2a. The insertion unit 2a is part of the transmission cable 3. The insertion unit 2a is to be inserted inside a living body, which is a subject. The endoscope insertion unit 2 generates a video signal by imaging the inside of the subject. The endoscope insertion unit 2 outputs the generated video signal to the control unit 6. A camera unit 9 shown in FIG. 2 is disposed in a distal end 2b of the insertion unit 2a. In the insertion unit 2a, the operation unit 4 is connected to the proximal end part opposite the distal end 2b. The operation unit 4 receives various operations for the endoscope insertion unit 2 from a user.

The transmission cable 3 connects the camera unit 9 and the connector unit 5. The video signal generated by the camera unit 9 is output to the connector unit 5 via the transmission cable 3.

The connector unit 5 is connected to the endoscope insertion unit 2 and the control unit 6. The connector unit 5 performs predetermined processing on the video signal output from the endoscope insertion unit 2. The connector unit 5 outputs the video signal to the control unit 6.

The control unit 6 performs image processing on the video signal output from the connector unit 5. Furthermore, the control unit 6 centrally controls the entire endoscope system 1.

The display device 7 displays a video based on the video signal processed by the control unit 6. In addition, the display device 7 displays various kinds of information related to the endoscope system 1.

FIG. 2 shows an internal configuration of the endoscope system 1. The endoscope system 1 shown in FIG. 2 includes the camera unit 9 and the control unit 6. The camera unit 9 is disposed in the distal end 2b of the scope 8. The operation unit 4, the connector unit 5, and the display device 7 are not shown in FIG. 2. The transmission cable 3 shown in FIG. 1 includes a power source line 30 and a video signal line 31 shown in FIG. 2.

The endoscope system 1 includes a light source device that generates illumination light emitted to the subject. The light source device is not shown in FIG. 2.

The camera unit 9 includes a power source terminal 900, a load circuit 901, a transmission buffer 902, a switch 903, a switch 904, a switch 905, a current source 906, and a video terminal 907. The load circuit 901 includes a switching control circuit 908 and an imager 909. At least one of the transmission buffer 902, the switch 903, the switch 904, the switch 905, the current source 906, and the switching control circuit 908 may be disposed in the imager 909.

The control unit 6 includes a voltage generation circuit 600, a voltage control circuit 601, a power source terminal 602, a video terminal 603, a switch 604, a switching control circuit 605, a resistor 606, a video-signal-processing circuit 607, a resistance adjustment circuit 608, and a voltage measurement circuit 609. All or part of the configuration of the control unit 6 shown in FIG. 2 may be disposed in the operation unit 4 or the connector unit 5 shown in FIG. 1.

A schematic configuration of the endoscope system 1 will be described. The camera unit 9 and the control unit 6 are connected to each other by both the power source line 30 that transfers a first power source voltage Vout and the video signal line 31 that transfers a video signal. The first power source voltage Vout transferred from the control unit 6 by the power source line 30 is input to the camera unit 9 as a second power source voltage Vcis. The imager 909 generates a video signal by using the second power source voltage Vcis. The current source 906 (load circuit) consumes the second power source voltage Vcis as a load current in a voltage-monitoring period. In other words, the current source 906 converts the second power source voltage Vcis into the load current in the voltage-monitoring period. The transmission buffer 902 outputs the video signal as a current to the video signal line 31 in a video output period different from the voltage-monitoring period. The switch 903 connects the power source line 30 and the video signal line 31 to each other in the voltage-monitoring period and disconnects the power source line 30 and the video signal line 31 from each other in the video output period.

The voltage generation circuit 600 generates the first power source voltage Vout and outputs the generated first power source voltage Vout to the power source line 30. The video-signal-processing circuit 607 (signal reception circuit) receives the video signal transferred from the camera unit 9 by the video signal line 31 in the video output period. The voltage measurement circuit 609 measures a value of a second power source voltage Vpro transferred from the camera unit 9 by the video signal line 31 in the voltage-monitoring period. The voltage control circuit 601 adjusts a value of the first power source voltage Vout in the video output period based on the value measured by the voltage measurement circuit 609.

The switch 903, the switch 904, the switch 905, and the switch 604 constitute a setting circuit. The switch 903, the switch 904, the switch 905, and the switch 604 set the state of each of the camera unit 9 and the control unit 6 to a video output state in the video output period and set the state of each of the camera unit 9 and the control unit 6 to a voltage-monitoring state in the voltage-monitoring period. The video signal generated by the imager 909 in the video output state is output to the video signal line 31. The output of the video signal from the imager 909 to the video signal line 31 is stopped in the voltage-monitoring state. The load circuit 901 consumes the second power source voltage Vcis as a current in the voltage-monitoring state. The second power source voltage Vcis is output to the video signal line 31 in the voltage-monitoring state. The output of the second power source voltage Vcis to the video signal line 31 is stopped in the video output state.

A detailed configuration of the endoscope system 1 will be described. For example, the voltage generation circuit 600 is a voltage regulator. The voltage generation circuit 600 generates the first power source voltage Vout, which is a direct-current (DC) voltage.

The voltage generation circuit 600 is connected to the power source terminal 602. The first power source voltage Vout generated by the voltage generation circuit 600 is input to the power source terminal 602. The power source terminal 602 is connected to the power source line 30. The power source terminal 602 is disposed at a point connecting the power source line 30 and the control unit 6. The power source terminal 602 outputs the first power source voltage Vout to the power source line 30. The power source line 30 is a signal line disposed in the transmission cable 3. The power source line 30 transfers the first power source voltage Vout output from the power source terminal 602 to the camera unit 9.

The power source terminal 900 is connected to the power source line 30. The power source terminal 900 is disposed at a point connecting the power source line 30 and the camera unit 9. The first power source voltage Vout transferred by the power source line 30 is input into the power source terminal 900. The power source terminal 900 outputs the first power source voltage Vout to each circuit in the camera unit 9 as the second power source voltage Vcis. The second power source voltage Vcis is a power source voltage transferred to the camera unit 9 by the power source line 30 and is a voltage on a path from the power source terminal 900 to the imager 909. A voltage drop is generated due to the DC resistance of the power source line 30, and the second power source voltage Vcis is attenuated. Therefore, the value of the second power source voltage Vcis is smaller than that of the first power source voltage Vout in the control unit 6.

The load circuit 901 is connected to the power source terminal 900. The load circuit 901 has a DC resistance value and consumes the second power source voltage Vcis as a current. The imager 909 is an image sensor such as a complementary metal-oxide semiconductor (CMOS) sensor. The imager 909 includes a plurality of pixels and is driven based on the second power source voltage Vcis. The imager 909 generates a video signal having a voltage generated based on the second power source voltage Vcis. The imager 909 outputs the video signal to the transmission buffer 902 in the video output period.

In the example shown in FIG. 2, the load circuit 901 includes the imager 909. The load circuit 901 does not need to include the imager 909. The load circuit 901 may include only the imager 909.

For example, the transmission buffer 902 is a transistor including a gate terminal, a source terminal, and a drain terminal and constitutes a source follower. The gate terminal of the transmission buffer 902 is connected to the imager 909. One of the source terminal and the drain terminal of the transmission buffer 902 is connected to the power source terminal 900, and the other of the source terminal and the drain terminal of the transmission buffer 902 is connected to the switch 904 and the switch 905.

The switch 903 is connected to the power source terminal 900 and the video terminal 907. The state of the switch 903 becomes either an ON state or an OFF state. The switch 903 can switch between the ON state and the OFF state.

The state of the switch 903 is set to the ON state in the voltage-monitoring period. When the state of the switch 903 is the ON state, the switch 903 connects the power source line 30 and the video signal line 31 to each other. The state of the switch 903 is set to the OFF state in the video output period. When the state of the switch 903 is the OFF state, the switch 903 disconnects the power source line 30 and the video signal line 31 from each other.

For example, the video output period is a period during which the imager 909 outputs the video signal. The voltage-monitoring period is all or part of a period excluding the video output period. For example, the voltage-monitoring period is a blanking period. The blanking period is at least one of a horizontal blanking period and a vertical blanking period. The imager 909 stops the output of the video signal in the blanking period.

The switch 904 is connected to the transmission buffer 902 and the video terminal 907. The state of the switch 904 becomes either an ON state or an OFF state. The switch 904 can switch between the ON state and the OFF state.

The state of the switch 904 is set to the OFF state in the voltage-monitoring period. When the state of the switch 904 is the OFF state, the switch 904 disconnects the transmission buffer 902 and the video signal line 31 from each other. The state of the switch 904 is set to the ON state in the video output period. When the state of the switch 904 is the ON state, the switch 904 connects the transmission buffer 902 and the video signal line 31 to each other.

The switch 905 is connected to the transmission buffer 902 and the current source 906. The state of the switch 905 becomes either an ON state or an OFF state. The switch 905 can switch between the ON state and the OFF state.

The state of the switch 905 is set to the ON state in the voltage-monitoring period. When the state of the switch 905 is the ON state, the switch 905 connects the transmission buffer 902 and the current source 906 to each other. The state of the switch 905 is set to the OFF state in the video output period. When the state of the switch 905 is the OFF state, the switch 905 disconnects the transmission buffer 902 and the current source 906 from each other.

The switching control circuit 908 outputs a control signal SWv to the switch 903, thus controlling the state of the switch 903. The switching control circuit 908 outputs a control signal SWo to the switch 904, thus controlling the state of the switch 904. The switching control circuit 908 outputs a control signal SWg to the switch 905, thus controlling the state of the switch 905.

The switching control circuit 908 sets the state of each of the switches 903 and 905 to the OFF state and sets the state of the switch 904 to the ON state in the video output period. At this time, the transmission buffer 902 outputs the video signal to the video terminal 907 via the switch 904. A current Ibuf of the video signal flows from the transmission buffer 902 to the video terminal 907 via the switch 904.

The switching control circuit 908 sets the state of each of the switches 903 and 905 to the ON state and sets the state of the switch 904 to the OFF state in the voltage-monitoring period. At this time, the power source line 30 and the video signal line 31 are short-circuited, and the second power source voltage Vcis is output to the video terminal 907. Since the transmission buffer 902 and the video terminal 907 are disconnected from each other by the switch 904, the video signal is not output from the transmission buffer 902 to the video terminal 907. Therefore, the output of the video signal to the video signal line 31 is stopped.

The transmission buffer 902 and the current source 906 are connected to each other by the switch 905 in the voltage-monitoring period. At this time, a current Iload (load current) flows through the transmission buffer 902, the switch 905, and the current source 906. The current source 906 is set in advance such that the amount of the current load matches the amount of the current Ibuf. The amount of the current Iload flowing through the transmission buffer 902 in the voltage-monitoring period is the same as that of the current Ibuf flowing through the transmission buffer 902 in the video output period. The current Iload is consumed by the resistance component of each of the transmission buffer 902, the switch 905, and the current source 906.

The video terminal 907 is connected to the switch 903, the switch 904, and the video signal line 31. The second power source voltage Vcis is input to the video terminal 907 in the voltage-monitoring period. The video signal output from the transmission buffer 902 is input to the video terminal 907 in the video output period. The video terminal 907 outputs the second power source voltage Vcis or the video signal to the video signal line 31. The video signal line 31 is a signal line disposed in the transmission cable 3. The video signal line 31 transfers the second power source voltage Vcis or the video signal output from the video terminal 907 to the control unit 6. The second power source voltage Vcis is input to the control unit 6 as the second power source voltage Vpro.

The video terminal 603 is connected to the video signal line 31. The video terminal 603 is disposed at a point connecting the video signal line 31 and the control unit 6. The second power source voltage Vcis or the video signal transferred by the video signal line 31 is input into the video terminal 603.

The switch 604 is connected to the video terminal 603, the voltage measurement circuit 609, and the video-signal-processing circuit 607. The state of the switch 604 becomes either a voltage-monitoring state or a video output state. The switch 604 can switch between the voltage-monitoring state and the video output state.

The state of the switch 604 is set to the voltage-monitoring state in the voltage-monitoring period. When the state of the switch 604 is the voltage-monitoring state, the switch 604 disconnects the video signal line 31 and the video-signal-processing circuit 607 from each other and connects the video signal line 31 and the voltage measurement circuit 609 to each other. The state of the switch 604 is set to the video output state in the video output period. When the state of the switch 604 is the video output state, the switch 604 connects the video signal line 31 and the video-signalprocessing circuit 607 to each other and disconnects the video signal line 31 and the voltage measurement circuit 609 from each other.

The switching control circuit 605 outputs a control signal MUX to the switch 604, thus controlling the state of the switch 604. The switching control circuit 605 sets the state of the switch 604 to the voltage-monitoring state in the voltage-monitoring period. The second power source voltage Vcis transferred by the video signal line 31 and input to the video terminal 603 is output from the video terminal 603 as the second power source voltage Vpro. The second power source voltage Vpro is output to the voltage measurement circuit 609 via the switch 604. The switching control circuit 605 sets the state of the switch 604 to the video output state in the video output period. The video signal transferred by the video signal line 31 and input to the video terminal 603 is output to the video-signal-processing circuit 607 via the switch 604.

The resistor 606 is connected to the switch 604 and the video-signal-processing circuit 607. The resistor 606 is a terminal resistor. The video signal is input to the video-signal-processing circuit 607 in the video output period. For example, the video-signal-processing circuit 607 is an analog front end (AFE). The video-signal-processing circuit 607 receives the video signal and performs predetermined signal processing on the video signal. In a case in which the resistor 606 is unnecessary or has a high resistance value, the switch 604 and the switching control circuit 605 are not necessarily disposed.

The resistance adjustment circuit 608 and the voltage measurement circuit 609 are connected to the switch 604. The resistance adjustment circuit 608 and the voltage measurement circuit 609 constitute a resistance circuit having a DC resistance value. The resistance value of the input terminal (the input terminal of the voltage measurement circuit 609) of the resistance circuit is extremely large, and the resistance circuit is in a high-impedance state (Hi-Z). The second power source voltage Vpro is input to the input terminal of the resistance circuit in the voltage-monitoring period.

Since the resistance circuit is in the high-impedance state, a current hardly flows through the video signal line 31 in the voltage-monitoring period. The value of the second power source voltage Vpro input to the resistance circuit is almost the same as that of the second power source voltage Vcis input to the power source terminal 900 in the camera unit 9.

The resistance circuit needs to have at least a larger resistance value than that of the video signal line 31. The resistance value of the video signal line 31 and an approximate resistance value of the load circuit 901 are known. The switch 604 connects the video signal line 31 and the resistance circuit to each other in the voltage-monitoring period and disconnects the video signal line 31 and the resistance circuit from each other in the video output period.

For example, the resistance adjustment circuit 608 is an input impedance of the voltage measurement circuit 609 or a capacitance element through which a DC current hardly flows.

The voltage measurement circuit 609 measures a value of the second power source voltage Vpro in the voltage-monitoring period. The voltage measurement circuit 609 outputs the measured value of the second power source voltage Vpro to the voltage control circuit 601. The video-signal-processing circuit 607 may have the function of the voltage measurement circuit 609.

The value of the second power source voltage Vpro measured in the voltage-monitoring period is almost the same as that of the second power source voltage Vcis. The amount of the current Iload flowing through the transmission buffer 902 in the voltage-monitoring period is the same as that of the current Ibuf flowing through the transmission buffer 902 in the video output period. Therefore, the value of the second power source voltage Vcis in the voltage-monitoring period is the same as that of the second power source voltage Vcis in the video output period. The voltage measurement circuit 609 can obtain the value of the second power source voltage Vcis in the video output period by measuring the value of the second power source voltage Vpro in the voltage-monitoring period.

The voltage control circuit 601 controls the voltage generation circuit 600 based on the value of the second power source voltage Vpro in the video output period. Specifically, the voltage control circuit 601 adjusts the value of the first power source voltage Vout generated by the voltage generation circuit 600. Since the value of the second power source voltage Vpro is almost the same as that of the second power source voltage Vcis, the voltage control circuit 601 adjusts the value of the first power source voltage Vout such that the value of the second power source voltage Vpro matches a target value of the second power source voltage Vcis.

For example, the voltage measurement circuit 609 includes a comparator that compares the second power source voltage Vpro with a target voltage. The value of the target voltage is the same as the target value of the second power source voltage Vcis. The comparator outputs a signal indicating a result of the comparison to the voltage control circuit 601. When the second power source voltage Vpro is lower than the target voltage, the voltage control circuit 601 increases the value of the first power source voltage Vout. When the second power source voltage Vpro is higher than the target voltage, the voltage control circuit 601 reduces the value of the first power source voltage Vout.

The voltage measurement circuit 609 may include an AD converter and may output a digital value of the second power source voltage Vpro to the voltage control circuit 601. The voltage control circuit 601 may control the voltage generation circuit 600 based on the digital value.

Figure 3:
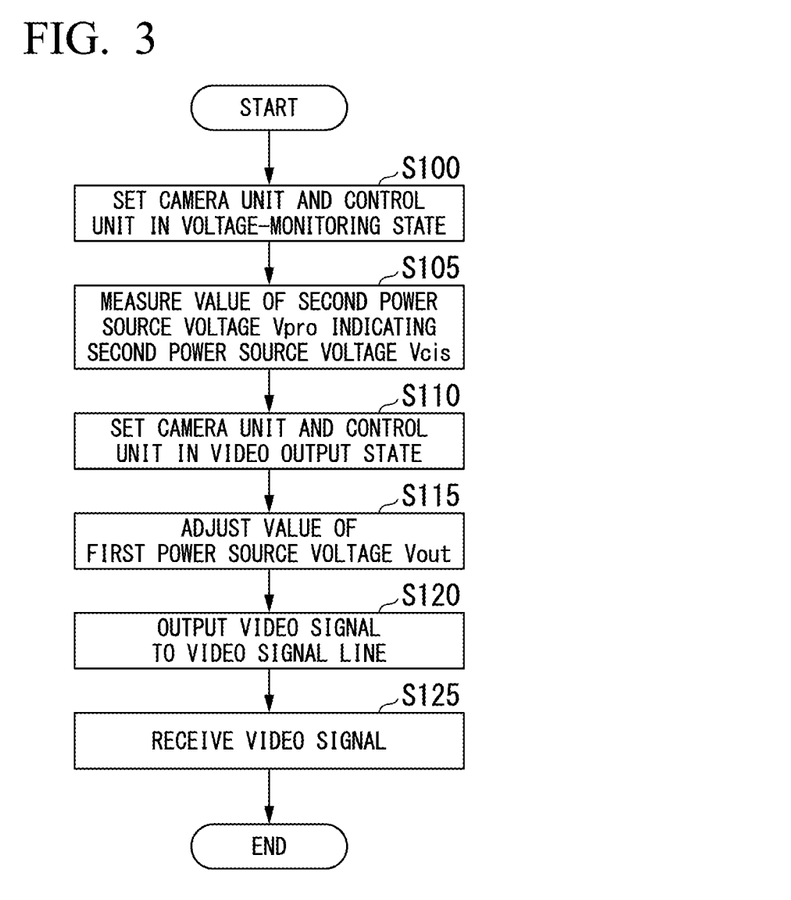
FIG. 3 is a flow chart showing a procedure of an operation of the endoscope system according to the first embodiment of the present invention.
Figure 4:
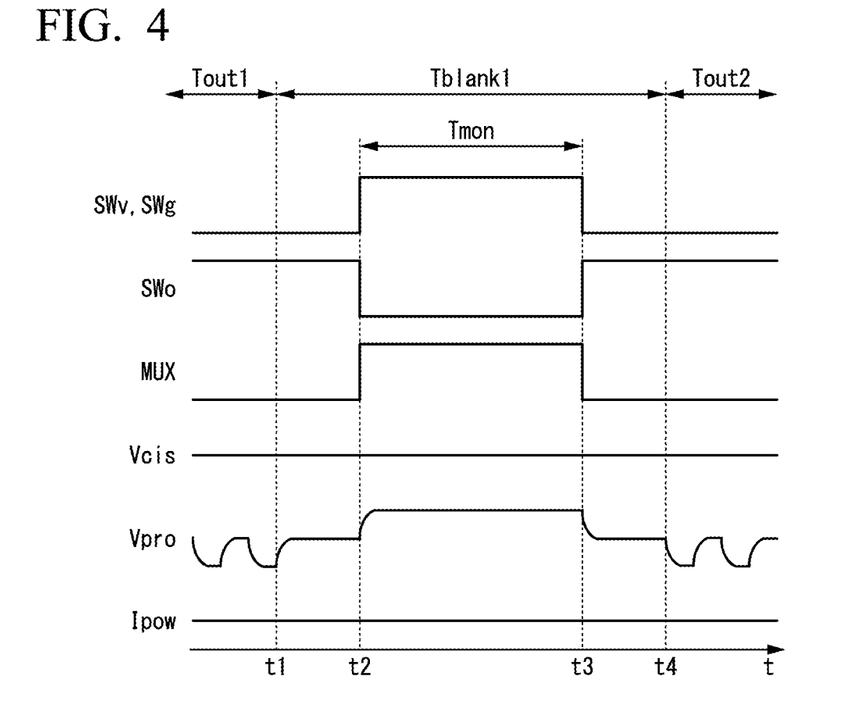
FIG. 4 is a timing chart showing a waveform of each signal in the endoscope system according to the first embodiment of the present invention.

FIG. 3 shows a procedure of an operation of the endoscope system 1. FIG. 4 shows waveforms of the control signal SWv, the control signal SWg, the control signal SWo, the control signal MUX, the second power source voltage Vcis, the second power source voltage Vpro, and a current Ipow. The current Ipow flows through the power source line 30. The horizontal direction in FIG. 4 indicates time, and the vertical direction in FIG. 4 indicates a voltage value or a current value of each signal. The operation of the endoscope system 1 will be described by using FIG. 3 and FIG. 4.

FIG. 4 shows a waveform of each signal in a video output period Tout1, a blanking period Tblank1, and a video output period Tout2. The video output period and the blanking period periodically occur.

In the video output period Tout1 shown in FIG. 4, the voltage of each of the control signals SWv, SWg, and MUX is a low (L) level, and the voltage of the control signal SWo is a high (H) level. In the video output period Tout1, the state of each of the switches 903 and 905 is the OFF state, and the state of the switch 904 is the ON state. The state of the switch 604 is the video output state.

At a time point t1 shown in FIG. 4, the video output period Tout1 is completed, and the blanking period Tblank1 is started. At a time point t2 in the blanking period Tblank1, the voltage of each of the control signals SWv, SWg, and MUX is set to the H level, and the voltage of the control signal SWo is set to the L level. At this time, the state of each of the switches 903 and 905 changes to the ON state, and the state of the switch 904 changes to the OFF state. In addition, the state of the switch 604 changes to the voltage-monitoring state. Due to this, the state of each of the camera unit 9 and the control unit 6 is set to the voltage-monitoring state (Step S100). A voltage-monitoring period Tmon is started at the time point t2.

The second power source voltage Vcis input to the camera unit 9 is output to the video signal line 31. The second power source voltage Vcis is transferred to the control unit 6 by the video signal line 31 and is input to the control unit 6 as the second power source voltage Vpro. The second power source voltage Vpro is input to the voltage measurement circuit 609. The voltage measurement circuit 609 measures the value of the second power source voltage Vpro indicating the second power source voltage Vcis (Step S105).

At a time point t3 in the blanking period Tblank1, the voltage of each of the control signals SWv, SWg, and MUX is set to the L level, and the voltage of the control signal SWo is set to the H level. At this time, the state of each of the switches 903 and 905 changes to the OFF state, and the state of the switch 904 changes to the ON state. In addition, the state of the switch 604 changes to the video output state. Due to this, the state of each of the camera unit 9 and the control unit 6 is set to the video output state (Step S110). The voltage-monitoring period Tmon is completed at the time point t3.

At a time point t4 shown in FIG. 4, the blanking period Tblank1 is completed, and the video output period Tout2 is started. The voltage control circuit 601 adjusts the value of the first power source voltage Vout based on the value of the second power source voltage Vpro measured by the voltage measurement circuit 609 in the voltage-monitoring period Tmon (Step S115).

The video signal generated by the imager 909 is output to the video signal line 31 (Step S120). The video signal is transferred to the control unit 6 by the video signal line 31. The video-signal-processing circuit 607 receives the video signal (Step S125).

In a case in which a current flowing through the imager 909 in the video output period can be ignored, Step S100 and Step S105 may be executed before the imager 909 is activated.

The video output period may include a first video output period and a second video output period. The imager 909 includes a first pixel in which incident light is blocked and a second pixel in which incident light is not blocked. In the first video output period, a first signal is read from the first pixel, and a video signal is generated based on the first signal. In the second video output period, a second signal is read from the second pixel, and a video signal is generated based on the second signal. The value of the current Ibuf of the video signal may be different between the first video output period, the second video output period, and a period that is included in the blanking period and excludes the voltage-monitoring period.

For example, the value (Ibuf_max) of the current Ibuf of the video signal in the period that is included in the blanking period and excludes the voltage-monitoring period is the largest. The value (Ibuf_min) of the current Ibuf of the video signal in the second video output period is the smallest. The maximum value Ibuf_max of the current Ibuf and the minimum value Ibuf_min of the current Ibuf are known. The value of the current Iload may be set to an average value (Ibuf_ave) of the maximum value Ibuf_max and the minimum value Ibuf_min. The value of the current Ibuf of the video signal in the first video output period may be the largest.

In a case in which a predetermined voltage condition is allowed, the value of the current Iload may be different from that of the current Ibuf. The predetermined voltage condition indicates that the second power source voltage Vcis in the video output period is included in a recommended voltage range (allowable voltage range). The recommended voltage range includes the target value of the second power source voltage Vcis. For example, the target value is 3.3 V. Hereinafter, an allowable error of the value of the current Iload with respect to the value of the current Ibuf will be described.

The allowable error of the value of the current Iload depends on the resistance value of the power source line 30, the maximum value Ibuf_max, and the minimum value Ibuf_min. As the resistance value of the power source line 30 increases, the allowable error decreases. In addition, as the difference between the maximum value Ibuf_max and the minimum value Ibuf_min increases, the allowable error decreases.

Hereinafter, a first example, a second example, and a third example will be described. In each of the examples, the maximum value Ibuf_max is 6 mA, and the minimum value Ibuf_min is 4 mA.

Figure 5:
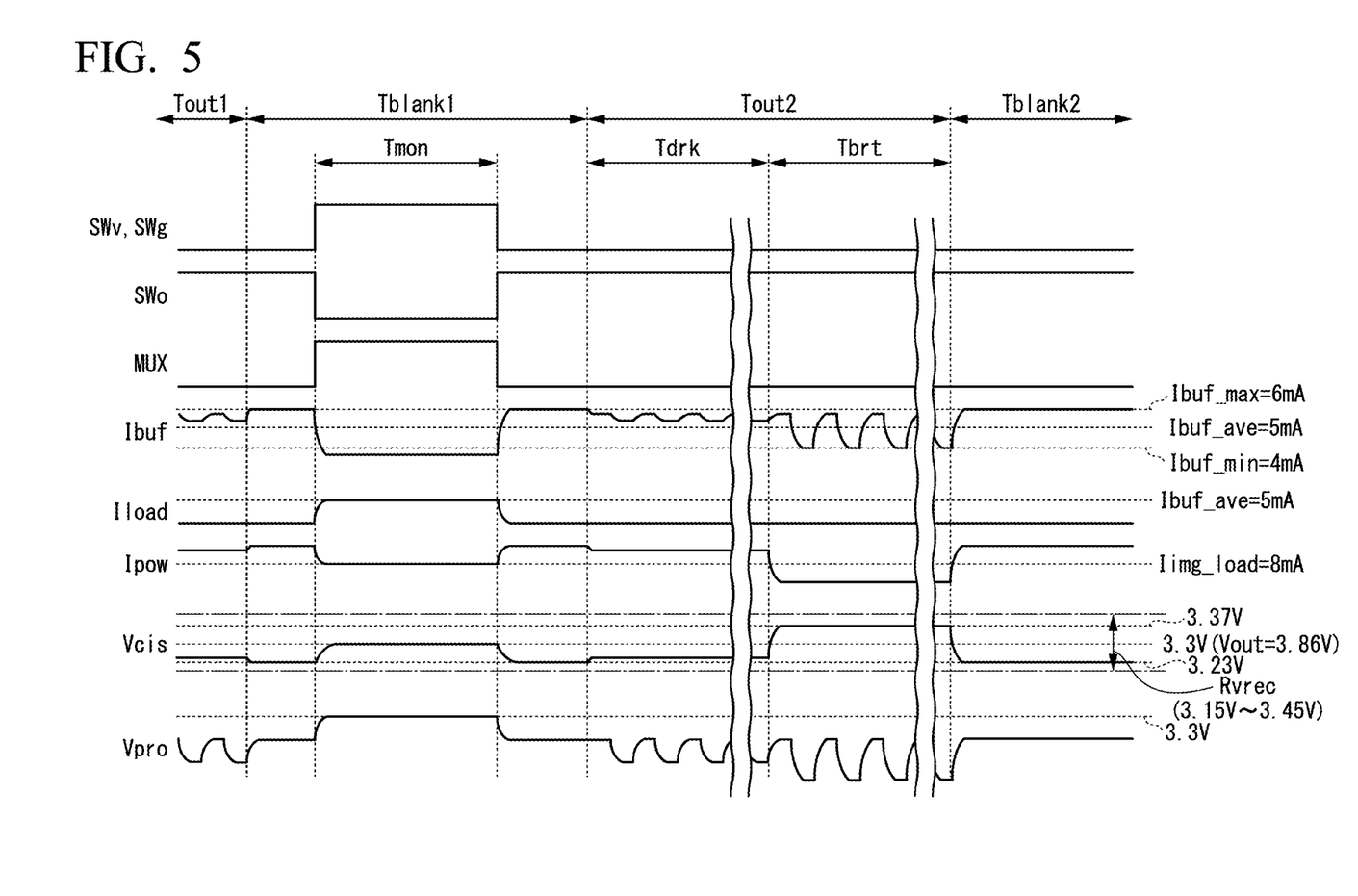
FIG. 5 is a timing chart showing a waveform of each signal in the endoscope system according to the first embodiment of the present invention.
Figure 6:
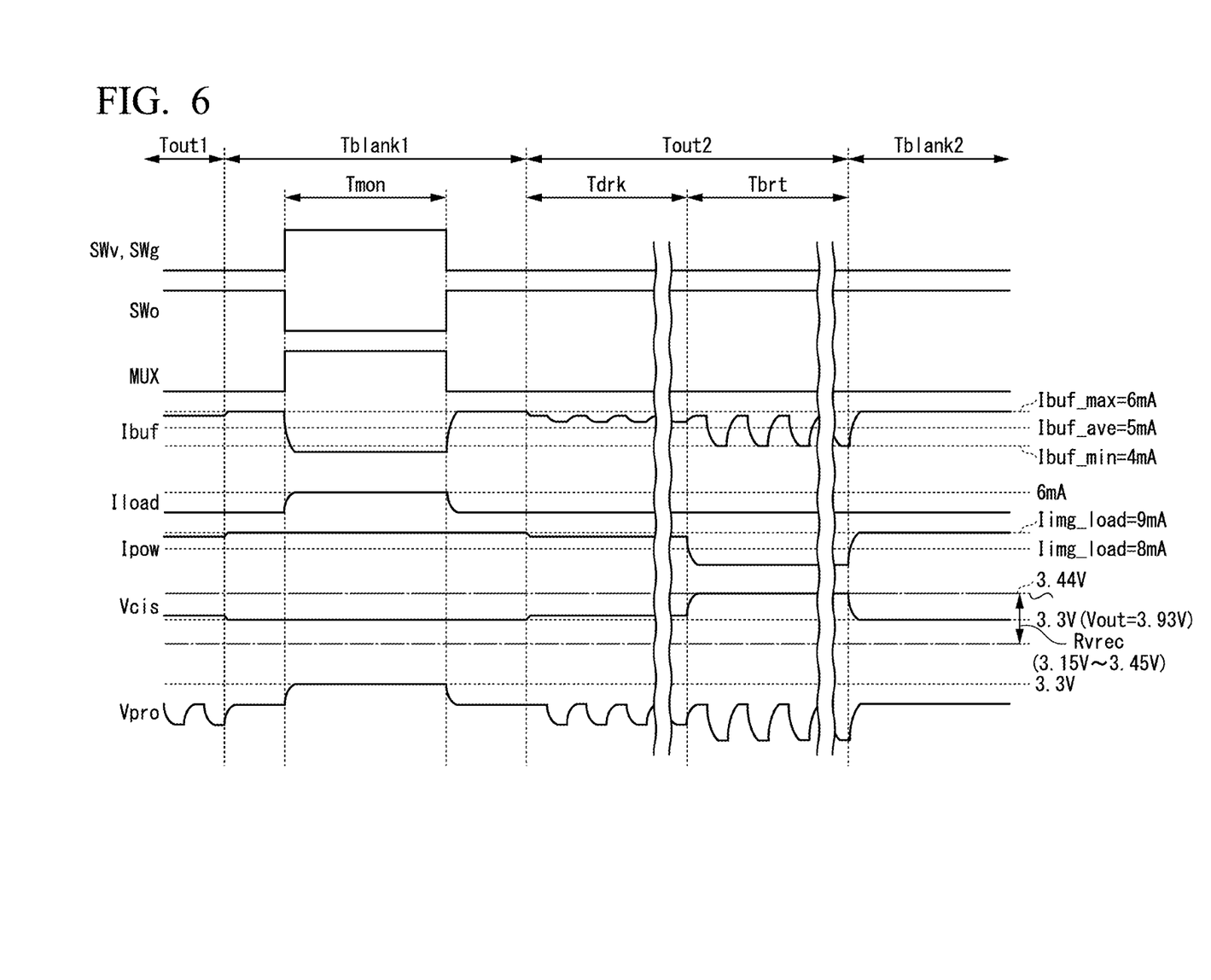
FIG. 6 is a timing chart showing a waveform of each signal in the endoscope system according to the first embodiment of the present invention.
Figure 7:
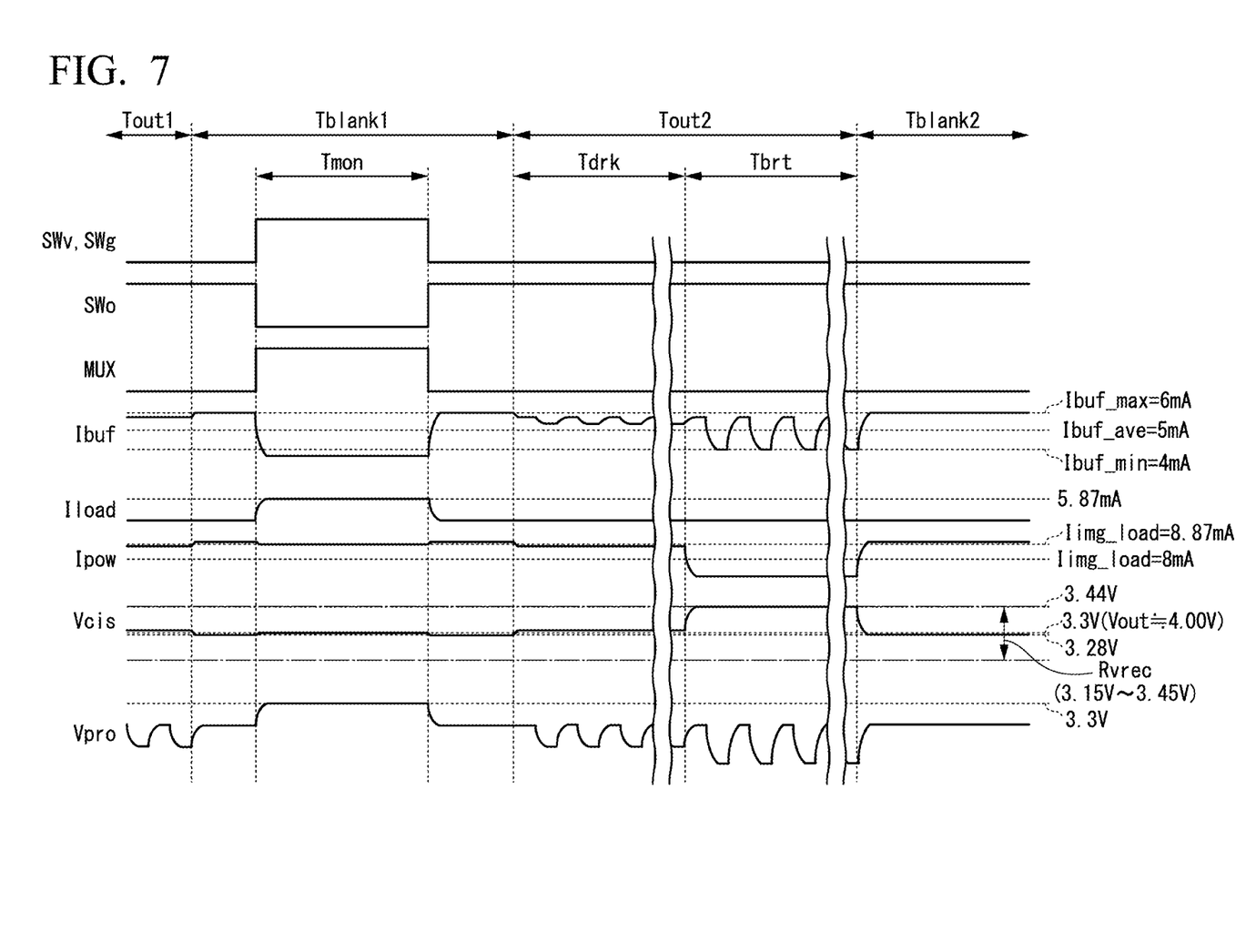
FIG. 7 is a timing chart showing a waveform of each signal in the endoscope system according to the first embodiment of the present invention.

FIGS. 5 to 7 show waveforms of the control signal SWv, the control signal SWg, the control signal SWo, the control signal MUX, the current Ibuf, the current Iload, the current Ipow, the second power source voltage Vcis, and the second power source voltage Vpro in the first to third examples. The horizontal direction in FIGS. 5 to 7 indicates time, and the vertical direction in FIGS. 5 to 7 indicates a voltage value or a current value of each signal.

FIGS. 5 to 7 show a waveform of each signal in a video output period Tout1, a blanking period Tblank1, a video output period Tout2, and a blanking period Tblank2. The blanking period Tblank1 includes a voltage-monitoring period Tmon. The video output period Tout2 includes a first video output period Tdrk and a second video output period Tbrt.

A recommended voltage range Rvrec of the second power source voltage Vcis is 3.15 V to 3.45 V. The value of a current flowing through the load circuit 901 is 3 mA. The value of a current Iimg_load flowing through the power source line 30 in the voltage-monitoring period Tmon is the sum of the value of the current flowing through the load circuit 901 and the value of the current Ibuf. Hereinafter, the maximum value and the minimum value of the second power source voltage Vcis in a period excluding the voltage-monitoring period Tmon will be described.

First, the first example will be described by using FIG. 5. The resistance value of the power source line 30 is 70Ω. The value of the current Iload in the voltage-monitoring period Tmon is set to 5 mA that is the same as the average value Ibuf_ave. The value of the current Iimg_load flowing through the power source line 30 in the voltage-monitoring period Tmon is 8 mA.

A necessary value of the first power source voltage Vout for causing the value of the second power source voltage Vcis to match the target value (3.3 V) is 3.86 V shown in the following Expression (2).

$$3.3+70*0.008=3.86 \qquad (2)$$

When the value of the current Ibuf is minimized, the value of the second power source voltage Vcis is maximized. The minimum value Ibuf_min of the current Ibuf is 4 mA. At this time, the value of the current Iimg_load flowing through the power source line 30 is 7 mA. The maximum value of the second power source voltage Vcis is 3.37 V shown in the following Expression (3).

$$3.86-70*0.007=3.37 \qquad (3)$$

When the value of the current Ibuf is maximized, the value of the second power source voltage Vcis is minimized. The maximum value Ibuf_max of the current Ibuf is 6 mA. At this time, the value of the current Iimg_load flowing through the power source line 30 is 9 mA. The minimum value of the second power source voltage Vcis is 3.23 V shown in the following Expression (4).

$$3.86-70*0.009=3.23 \qquad (4)$$

In the first example, the value of the second power source voltage Vcis fluctuates between 3.23 V and 3.37 V. The maximum value (3.37 V) of the second power source voltage Vcis is lower than the upper limit value (3.45 V) of the recommended voltage range Rvrec, and the minimum value (3.23 V) of the second power source voltage Vcis is higher than the lower limit value (3.15 V) of the recommended voltage range Rvrec. Therefore, there is a margin of the second power source voltage Vcis in the recommended voltage range Rvrec.

Next, the second example will be described by using FIG. 6. The resistance value of the power source line 30 is 70Ω. The value of the current Iload in the voltage-monitoring period Tmon increases by 20% from the average value Ibuf_ave (5 mA), and is set to 6 mA. The value of the current Iimg_load flowing through the power source line 30 in the voltage-monitoring period Tmon is 9 mA.

A necessary value of the first power source voltage Vout for causing the value of the second power source voltage Vcis to match the target value (3.3 V) is 3.93 V shown in the following Expression (5).

$$3.3+70*0.009=3.93 \qquad (5)$$

When the value of the current Ibuf is minimized, the value of the second power source voltage Vcis is maximized. The minimum value Ibuf_min of the current Ibuf is 4 mA. At this time, the value of the current Iimg_load flowing through the power source line 30 is 7 mA. The maximum value of the second power source voltage Vcis is 3.44 V shown in the following Expression (6).

$$3.93-70*0.007=3.44 \qquad (6)$$

When the value of the current Ibuf is maximized, the value of the second power source voltage Vcis is minimized. The maximum value Ibuf_max of the current Ibuf is 6 mA. At this time, the value of the current Iimg_load flowing through the power source line 30 is 9 mA. The minimum value of the second power source voltage Vcis is 3.3 V shown in the following Expression (7).

$$3.93-70*0.009=3.3 \qquad (7)$$

In the second example, the value of the second power source voltage Vcis fluctuates between 3.3 V and 3.44 V. The maximum value (3.44 V) of the second power source voltage Vcis is lower than the upper limit value (3.45 V) of the recommended voltage range Rvrec, and the minimum value (3.3 V) of the second power source voltage Vcis is higher than the lower limit value (3.15 V) of the recommended voltage range Rvrec. The maximum value (3.44 V) of the second power source voltage Vcis is almost the same as the upper limit value (3.45 V) of the recommended voltage range Rvrec, and there is no margin of the upper limit value of the second power source voltage Vcis in the recommended voltage range Rvrec.

Next, the third example will be described by using FIG. 7. The temperature in the third example is different from that in the first example. The resistance value of the power source line 30 changes to 80Ω. The value of the current Iload in the voltage-monitoring period Tmon increases by about 17% from the average value Ibuf_ave (5 mA), and is set to 5.87 mA. The value of the current Iimg_load flowing through the power source line 30 in the voltage-monitoring period Tmon is 8.87 mA.

A necessary value of the first power source voltage Vout for causing the value of the second power source voltage Vcis to match the target value (3.3 V) is 4.00 V shown in the following Expression (8).

$$3.3+80*0.00887=4.00 \qquad (8)$$

When the value of the current Ibuf is minimized, the value of the second power source voltage Vcis is maximized. The minimum value Ibuf_min of the current Ibuf is 4 mA. At this time, the value of the current Iimg_load flowing through the power source line 30 is 7 mA. The maximum value of the second power source voltage Vcis is 3.44 V shown in the following Expression (9).

$$4.00-80*0.007=3.44 \qquad (9)$$

When the value of the current Ibuf is maximized, the value of the second power source voltage Vcis is minimized. The maximum value Ibuf_max of the current Ibuf is 6 mA. At this time, the value of the current Iimg_load flowing through the power source line 30 is 9 mA. The minimum value of the second power source voltage Vcis is 3.28 V shown in the following Expression (10).

$$4.00-80*0.009=3.28 \qquad (10)$$

In the third example, the value of the second power source voltage Vcis fluctuates between 3.28 V and 3.44 V. The maximum value (3.44 V) of the second power source voltage Vcis is lower than the upper limit value (3.45 V) of the recommended voltage range Rvrec, and the minimum value (3.28 V) of the second power source voltage Vcis is higher than the lower limit value (3.15 V) of the recommended voltage range Rvrec. The maximum value (3.44 V) of the second power source voltage Vcis is almost the same as the upper limit value (3.45 V) of the recommended voltage range Rvrec, and there is no margin of the upper limit value of the second power source voltage Vcis in the recommended voltage range Rvrec.

The resistance value of the power source line 30 in the third example is larger than that in the first example. Therefore, an influence of an error of the second power source voltage Vpro measured in the voltage-monitoring period increases. Due to the error, the value of the second power source voltage Vcis in the third example is larger than that in the first example.

An imaging method according to each aspect of the present invention includes a connection step, a voltage measurement step, a disconnection step, a video output step, a signal reception step, and a voltage adjustment step. The switch 903 connects the power source line 30 and the video signal line 31 to each other in the voltage-monitoring period (connection step (Step S100)). The current source 906 consumes the second power source voltage Vcis as a load current (load) in the voltage-monitoring period (connection step (Step S100)). The voltage measurement circuit 609 measures the value of the second power source voltage Vpro transferred from the camera unit 9 by the video signal line 31 in the voltage-monitoring period (voltage measurement step (Step S105)). The switch 903 disconnects the power source line 30 and the video signal line 31 from each other in the video output period different from the voltage-monitoring period (disconnection step (Step S110)). The transmission buffer 902 outputs the video signal as a current (Ibuf) to the video signal line 31 in the video output period (video output step (Step S120)). The video-signal-processing circuit 607 (signal reception circuit) receives the video signal transferred from the camera unit 9 by the video signal line 31 in the video output period (signal reception step (Step S125)). The voltage control circuit 601 adjusts the value of the first power source voltage Vout in the video output period based on the value measured by the voltage measurement circuit 609 (voltage adjustment step (Step S115)).

Each aspect of the present invention may include the following modified example. The amount of the load current (Iload) is the same as that of the current (Ibuf) of the video signal.

Each aspect of the present invention may include the following modified example. The voltage-monitoring period is included in a blanking period of the imager 909.

In the first embodiment, the voltage measurement circuit 609 measures the value of the second power source voltage Vpro transferred from the camera unit 9 by the video signal line 31 in the voltage-monitoring period. The voltage control circuit 601 adjusts the value of the first power source voltage Vout in the video output period based on the value measured by the voltage measurement circuit 609. Therefore, the endoscope system 1 can monitor a power source voltage provided to an imager. Since the video signal line 31 is used for transferring the video signal and the second power source voltage Vcis, a dedicated cable for transferring the second power source voltage Vcis is unnecessary. Therefore, the endoscope system 1 is suitable for the miniaturization of a camera unit.

In a method of monitoring the second power source voltage Vcis in accordance with Expression (1) described above, it is necessary to measure the current value of the power source line 30 and calculate the resistance value of the power source line 30. The endoscope system 1 according to the first embodiment does not need to measure the current value of the power source line 30 and does not need to calculate the resistance value of the power source line 30.

Second Embodiment

Figure 8:
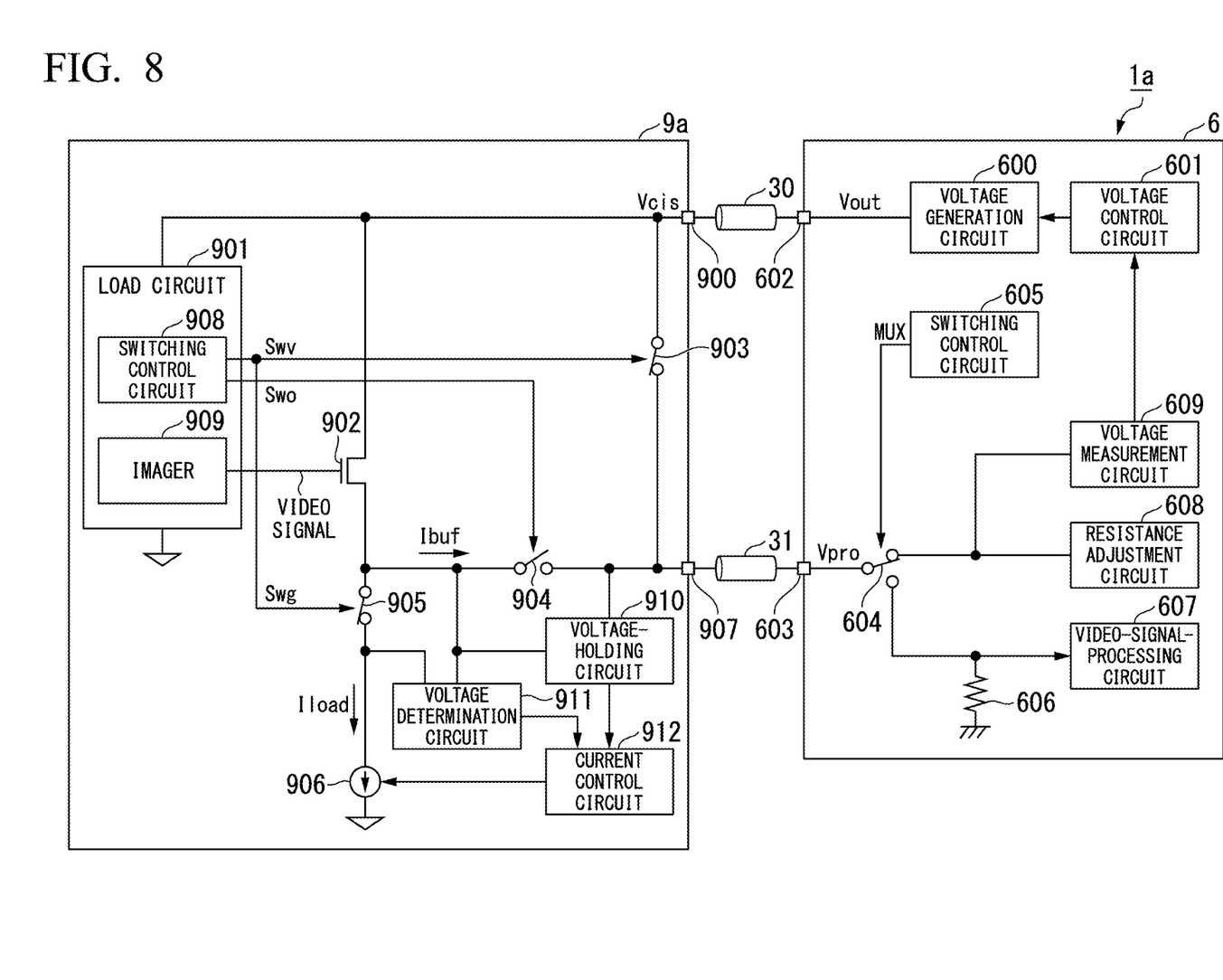
FIG. 8 is a block diagram showing a configuration of an endoscope system according to a second embodiment of the present invention.

FIG. 8 shows a configuration of an endoscope system 1a according to a second embodiment of the present invention. The same configuration as that shown in FIG. 2 will not be described.

The camera unit 9 shown in FIG. 2 is changed to a camera unit 9a. The camera unit 9a includes a power source terminal 900, a load circuit 901, a transmission buffer 902, a switch 903, a switch 904, a switch 905, a current source 906, a video terminal 907, a voltage-holding circuit 910, a voltage determination circuit 911, and a current control circuit 912. The load circuit 901 includes a switching control circuit 908 and an imager 909. At least one of the transmission buffer 902, the switch 903, the switch 904, the switch 905, the current source 906, the switching control circuit 908, the voltage-holding circuit 910, the voltage determination circuit 911, and the current control circuit 912 may be disposed in the imager 909. The control unit 6 is the same as that shown in FIG. 2.

When the current Ibuf of the video signal flows through the switch 904 in the video output period, a voltage drop is generated in the switch 904 in accordance with the resistance value of the switch 904. The voltage-holding circuit 910 holds a voltage (first voltage) across the switch 904. The first voltage indicates the difference between the voltage at one of the two terminals of the switch 904 and the voltage at the other of the two terminals of the switch 904. For example, the voltage-holding circuit 910 includes a capacitor used for holding the first voltage.

When the current Iload flows through the switch 905 in the voltage-monitoring period, a voltage drop is generated in the switch 905 in accordance with the resistance value of the switch 905. The voltage determination circuit 911 determines the voltage (second voltage) across the switch 905. The second voltage indicates the difference between the voltage at one of the two terminals of the switch 905 and the voltage at the other of the two terminals of the switch 905. The voltage determination circuit 911 outputs the determined second voltage to the current control circuit 912.

The current control circuit 912 controls the current source 906 based on the first voltage held in the voltage-holding circuit 910 and the second voltage determined by the voltage determination circuit 911. Specifically, the current control circuit 912 adjusts the value of the current Iload flowing through the current source 906 such that the second voltage matches the first voltage. The resistance value of the switch 905 is the same as that of the switch 904. When the second voltage matches the first voltage, the amount of the current Iload matches the amount of the current Ibuf.

For example, the current control circuit 912 includes both a comparator that compares the first voltage with the second voltage and a signal output circuit that outputs a control signal used for adjusting the value of the current Iload to the current source 906. When the second voltage is lower than the first voltage, the current control circuit 912 increases the value of the current Iload. When the second voltage is higher than the first voltage, the current control circuit 912 reduces the value of the current Iload.

Figure 9:
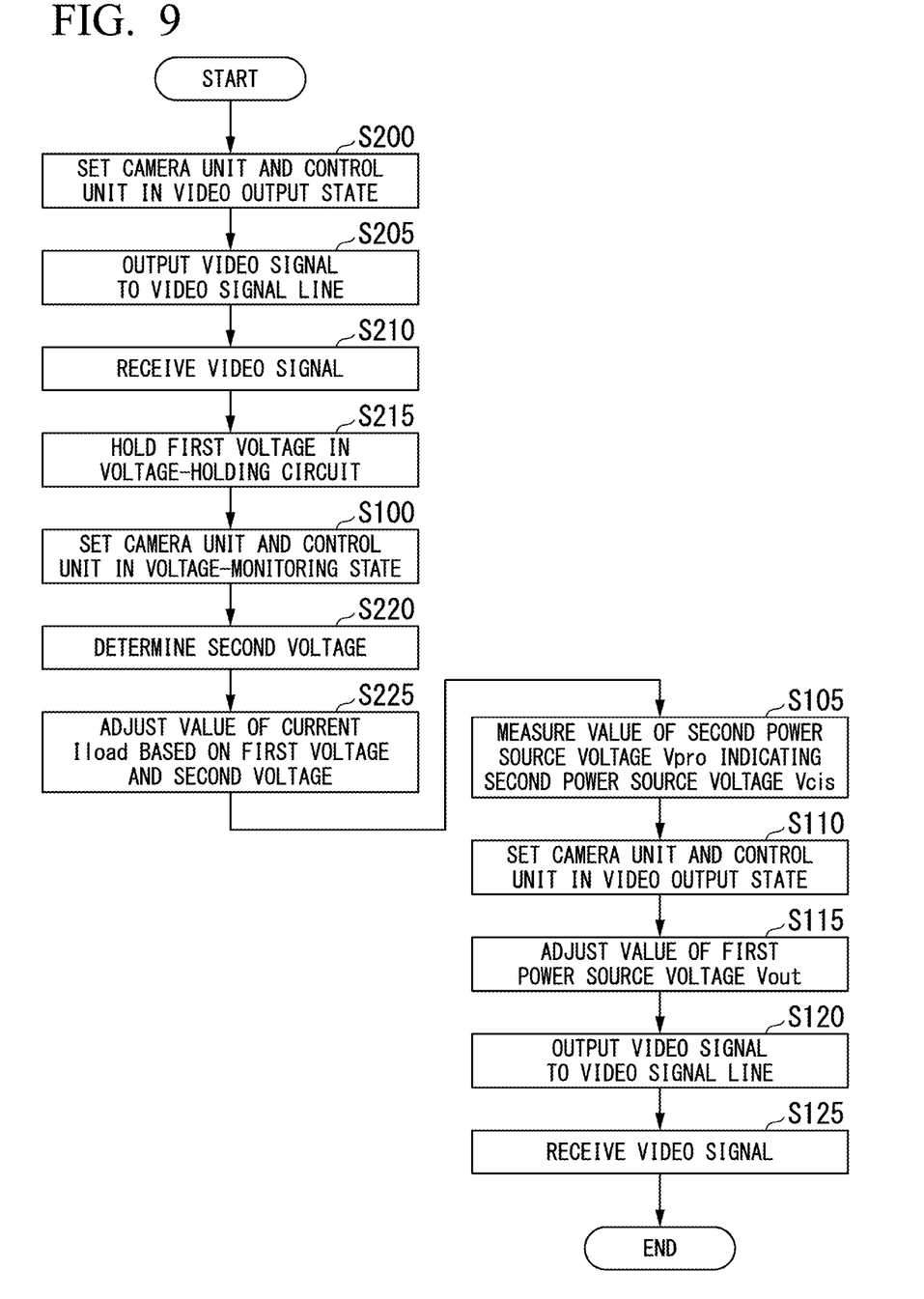
FIG. 9 is a flow chart showing a procedure of an operation of the endoscope system according to the second embodiment of the present invention.

FIG. 9 shows a procedure of an operation of the endoscope system 1a. The same steps as those shown in FIG. 3 will not be described. The operation of the endoscope system 1a will be described by using FIG. 9.

In a blanking period, the voltage of each of the control signals SWv, SWg, and MUX is set to the L level, and the voltage of the control signal SWo is set to the H level. At this time, the state of each of the switches 903 and 905 changes to the OFF state, and the state of the switch 904 changes to the ON state. In addition, the state of the switch 604 changes to the video output state. Due to this, the state of each of the camera unit 9a and the control unit 6 is set to the video output state (Step S200).

After the blanking period is completed and the video output period is started, the video signal generated by the imager 909 is output to the video signal line 31 (Step S205). The video signal is transferred to the control unit 6 by the video signal line 31. The video-signal-processing circuit 607 receives the video signal (Step S210).

When the video signal is output to the video signal line 31, the voltage-holding circuit 910 holds the first voltage across the switch 904 (Step S215).

After Step S215, the voltage of each of the control signals SWv, SWg, and MUX is set to the H level, and the voltage of the control signal SWo is set to the L level. At this time, the state of each of the switches 903 and 905 changes to the ON state, and the state of the switch 904 changes to the OFF state. In addition, the state of the switch 604 changes to the voltage-monitoring state. Due to this, the state of each of the camera unit 9a and the control unit 6 is set to the voltage-monitoring state (Step S100).

The voltage determination circuit 911 determines the second voltage across the switch 905 in the voltage-monitoring period (Step S220). The current control circuit 912 controls the current source 906 based on the first voltage and the second voltage, thus adjusting the value of the current Iload flowing through the current source 906 (Step S225).

Step S105, Step S110, Step S115, Step S120, and Step S125 are executed after Step S225 is executed. Each of the Steps is the same as that shown in FIG. 3.

Each aspect of the present invention may include the following modified example. The switch 904 (second switch) disconnects the transmission buffer 902 and the video signal line 31 from each other in the voltage-monitoring period and connects the transmission buffer 902 and the video signal line 31 to each other in the video output period. The switch 905 (third switch) connects the power source line 30 and the current source 906 (load circuit) to each other in the voltage-monitoring period and disconnects the power source line 30 and the current source 906 from each other in the video output period. The voltage-holding circuit 910 holds the first voltage generated in the switch 904 when the current Ibuf of the video signal flows through the switch 904 in the video output period. The voltage determination circuit 911 determines the second voltage generated in the switch 905 when the current Iload (load current) flows through the current source 906 in the voltage-monitoring period. The current control circuit 912 causes the amount of the current Iload to match the amount of the current Ibuf of the video signal based on the first voltage held in the voltage-holding circuit 910 and the second voltage determined by the voltage determination circuit 911.

In the second embodiment, the current control circuit 912 adjusts the value of the current Iload flowing through the current source 906 such that the second voltage matches the first voltage. In this way, the current control circuit 912 can cause the value of the current Iload and the value of the current Ibuf to accurately match each other.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device comprising a camera unit and a control unit connected to each other by a power source line and a video signal line, a first power source voltage transferred by the power source line being input to the camera unit as a second power source voltage,
    the camera unit including:
        an image sensor configured to generate a video signal by using the second power source voltage;
        a load circuit configured to consume the second power source voltage as a load current in a voltage-monitoring period;
        a transmission buffer configured to output the video signal as a current to the video signal line in a video output period different from the voltage-monitoring period; and
        a switch configured to connect the power source line and the video signal line in the voltage-monitoring period and disconnect the power source line and the video signal line in the video output period; and
    the control unit including;
        a voltage generation circuit configured to output the first power source voltage to the power source line;
        a signal reception circuit configured to receive the video signal transferred from the camera unit by the video signal line;
        a voltage measurement circuit configured to measure a value of the second power source voltage transferred from the camera unit by the video signal line; and
        a voltage control circuit configured to adjust a value of the first power source voltage in the video output period by controlling the voltage generation circuit based on the value measured by the voltage measurement circuit.

2. The imaging device according to claim 1,
    wherein an amount of the load current is the same as an amount of the current of the video signal.

3. The imaging device according to claim 1,
    wherein the voltage-monitoring period is included in a blanking period of the image sensor.

4. The imaging device according to claim 1,
    wherein the camera unit further includes:
        a second switch configured to disconnect the transmission buffer and the video signal line from each other in the voltage-monitoring period and connect the transmission buffer and the video signal line to each other in the video output period;
        a third switch configured to connect the power source line and the load circuit to each other in the voltage-monitoring period and disconnect the power source line and the load circuit from each other in the video output period;
        a voltage-holding circuit configured to hold a first voltage generated in the second switch when the current of the video signal flows through the second switch in the video output period;
        a voltage determination circuit configured to determine a second voltage generated in the third switch when the load current flows through the load circuit in the voltage-monitoring period; and
        a current control circuit configured to cause an amount of the load current to match an amount of the current of the video signal based on the first voltage held in the voltage-holding circuit and the second voltage determined by the voltage determination circuit.

5. An endoscope system, comprising
    a scope to be inserted into a living body; and
    the imaging device according to claim 1,
    wherein the camera unit is disposed in a distal end of the scope.

6. A camera unit connected to a control unit by a power source line that transfers a first power source voltage and a video signal line that transfers a video signal, the first power source voltage transferred from the control unit by the power source line being input to the camera unit as a second power source voltage, the camera unit comprising;
    an image sensor configured to generate the video signal by using the second power source voltage;
    a load circuit configured to consume the second power source voltage as a load current in a voltage-monitoring period;
    a transmission buffer configured to output the video signal as a current to the video signal line in a video output period different from the voltage-monitoring period; and a switch configured to connect the power source line and the video signal line to each other in the voltage-monitoring period and disconnect the power source line and the video signal line from each other in the video output period.

7. A scope to be inserted into a living body, the scope comprising the camera unit according to claim 6,
wherein the camera unit is disposed in a distal end of the scope.

8. An imaging method in an imaging device including a camera unit and a control unit connected to each other by a power source line and a video signal line, the control unit including a voltage generation circuit configured to output a first power source voltage to the power source line, the first power source voltage transferred from the control unit by the power source line being input to the camera unit as a second power source voltage used for driving an image sensor of the camera unit, the method comprising:

a connection step in which a switch of the camera unit connects the power source line and the video signal line in a voltage-monitoring period and a load circuit of the camera unit consumes the second power source voltage as a load current in the voltage-monitoring period;

a voltage measurement step in which a voltage measurement circuit of the control unit measures a value of the second power source voltage transferred from the camera unit by the video signal line in the voltage-monitoring period;

a disconnection step in which the switch disconnects the power source line and the video signal line in a video output period different from the voltage-monitoring period;

a video output step in which a transmission buffer of the camera unit outputs the video signal as a current to the video signal line in the video output period;

a signal reception step in which a signal reception circuit of the control unit receives the video signal transferred from the camera unit by the video signal line in the video output period; and a voltage adjustment step in which a voltage control circuit of the control unit adjusts a value of the first power source voltage in the video output period by controlling the voltage generation circuit based on the value measured by the voltage measurement circuit.

* * * * *